United States Patent
Hosoi

(10) Patent No.: US 11,342,172 B2
(45) Date of Patent: May 24, 2022

(54) MASS SPECTROMETER UTILIZING MALDI

(71) Applicant: Shimadzu Corporation, Kyoto (JP)

(72) Inventor: Kosuke Hosoi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 29 days.

(21) Appl. No.: 16/599,518

(22) Filed: Oct. 11, 2019

(65) Prior Publication Data

US 2020/0194248 A1 Jun. 18, 2020

(30) Foreign Application Priority Data

Dec. 13, 2018 (JP) .............................. JP2018-233596

(51) Int. Cl.
| | |
|---|---|
| H01J 49/16 | (2006.01) |
| G06K 7/10 | (2006.01) |
| G06K 7/14 | (2006.01) |
| G06K 19/06 | (2006.01) |
| H01J 49/02 | (2006.01) |

(52) U.S. Cl.
CPC ........ *H01J 49/164* (2013.01); *G06K 7/10722* (2013.01); *G06K 7/1417* (2013.01); *G06K 19/06037* (2013.01); *H01J 49/025* (2013.01)

(58) Field of Classification Search
CPC .. H01J 49/164; H01J 49/025; G06K 7/10722; G06K 7/1417; G06K 19/06037
See application file for complete search history.

(56) References Cited

U.S. PATENT DOCUMENTS

| | | |
|---|---|---|
| 2002/0012934 A1 | 1/2002 | Meghen et al. |
| 2009/0057552 A1 | 3/2009 | Yamada et al. |
| 2016/0210486 A1* | 7/2016 | Porreca ............ G06K 19/06028 |
| 2019/0006162 A1 | 1/2019 | Matsushita |

FOREIGN PATENT DOCUMENTS

| | | |
|---|---|---|
| JP | 2004-212206 A | 7/2004 |
| JP | 2009-052994 A | 3/2009 |
| JP | WO2017/085876 A1 | 5/2017 |

OTHER PUBLICATIONS

Extended European Search Report dated Mar. 19, 2020 in European Patent Application No. 19197303.1, 8 pages.
Notice of Reasons for Refusal dated Mar. 8, 2022 in the counterpart Japanese patent application No. 2018-233596 with English machine translation, 9 pages.

* cited by examiner

*Primary Examiner* — Laura A Gudorf
(74) *Attorney, Agent, or Firm* — Oblon, McClelland, Maier & Neustadt, L.L.P.

(57) ABSTRACT

A mass spectrometer includes a position controller that adjusts a position of a sample plate, an image acquirer that acquires an image of a sample/matrix mixture on the sample plate, a laser light emitter that emits laser light to the sample/matrix mixture, a detector that detects ions generated from the sample/matrix mixture by the emission of the laser light by the laser light emitter, and a controller that acquires an image of a sample plate identification code displayed on the sample plate by utilizing the image acquirer and specifies plate identification information of the sample plate from the image of the sample plate identification code.

20 Claims, 4 Drawing Sheets

| PLATE IDENTIFICATION INFORMATION | WELL POSITION INFORMATION | SAMPLE INFORMATION | ANALYSIS RESULT |
|---|---|---|---|
| P101 | A01 | S233 | |
| P101 | A02 | E414 | |
| P101 | A03 | R635 | |
| P101 | A04 | E420 | |
| ⋮ | ⋮ | ⋮ | ⋮ |

MASS SPECTROMETER UTILIZING MALDI

BACKGROUND OF THE INVENTION

Field of the Invention

The present invention relates to a mass spectrometer utilizing MALDI.

Description of Related Art

A mass spectrometer utilizing MALDI (Matrix Assisted Laser Desorption/Ionization) is provided. The mass spectrometer utilizing the MALDI uses a metallic sample plate in which a large number of wells are formed. A sample/matrix mixture is dropped in each of the wells of sample plate. After the sample/matrix mixture dropped in each well is dried, the sample plate is set in the mass spectrometer. Thereafter, the sample/matrix mixture is irradiated with laser light, so that the sample is ionized. The ionized sample is mass-separated and then detected by a detector. A detection signal of the sample acquired by the detector is applied to a data processor. The data processor produces a result of analysis of a mass spectrum and the like of the sample based on the detection signal.

In WO 2017/085876 A1, a barcode is displayed on a sample plate in order to associate a result of analysis produced by a data processor with the sample plate. In a mass spectrometer of WO 2017/085876 A1, a barcode reader is provided above an insertion port through which the sample plate is inserted into the mass spectrometer. When the sample plate is set in the mass spectrometer, the barcode reader reads the barcode displayed on the sample plate. This mass spectrometer specifies the sample plate from the barcode read by the barcode reader.

BRIEF SUMMARY OF THE INVENTION

In the mass spectrometer described in WO 2017/085876 A1, the sample plate can be specified by reading the barcode displayed on the sample plate. This mass spectrometer, however, needs a dedicated reader for reading the barcode and therefore requires an increased number of parts. Further, the cost of the mass spectrometer is increased as the number of parts is increased.

An object of the present invention is to provide a mechanism for specifying a sample plate in a mass spectrometer utilizing MALDI without increasing the number of parts.

(1) A mass spectrometer utilizing MALDI according to one aspect of the present invention includes a position controller that adjusts a position of a sample plate on which a sample/matrix mixture is arranged, an image acquirer that acquires an image of the sample/matrix mixture on the sample plate, for confirming a position of the sample/matrix mixture, a laser light emitter that emits laser light to the sample/matrix mixture on the sample plate, a detector that detects ions generated from the sample/matrix mixture by the emission of the laser light by the laser light emitter, and a controller that acquires an image of a sample plate identification code displayed on the sample plate by utilizing the image acquirer and specifies plate identification information of the sample plate from the image of the sample plate identification code.

This mass spectrometer utilizing the MALDI acquires the image of the sample plate identification code by utilizing the image acquirer, which is provided for the purpose of acquiring the image for confirming the position of the sample/matrix mixture. This mass spectrometer specifies the plate identification information from the image of the sample plate identification code.

With this mass spectrometer utilizing the MALDI, no new parts for acquiring the image of the sample plate identification code are needed. It is possible to provide the mechanism for specifying the sample plate in the mass spectrometer without increasing the number of parts.

(2) The sample plate identification code may include a two-dimensional code. Since the two-dimensional code is utilized as the sample plate identification code, a lot of information can be recorded in the sample plate identification code.

(3) When the image of the sample plate identification code is acquired by the image acquirer, a position of the sample plate identification code may be adjusted utilizing the position controller.

With this mass spectrometer utilizing the MALDI, the position controller for use in analysis processing is utilized to perform positional adjustment for acquiring the image of the sample plate identification code. As such, no new parts for adjusting the position are needed.

(4) The sample plate is provided with a plurality of wells in which a plurality of sample/matrix mixtures are arranged, and the controller may acquire an image of a well identification code that is displayed in a periphery of each well for identifying each well by utilizing the image acquirer, and may specify well identification information of each well from the image of the well identification code.

With this mass spectrometer utilizing the MALDI, no new parts for acquiring the image of the well identification code are needed. It is possible to provide the mechanism for specifying the well in the mass spectrometer without increasing the number of parts.

(5) The well identification code may include a two-dimensional code. Since the two-dimensional code is utilized as the well identification code, a lot of information can be recorded in the well identification code.

(6) When the image of the well identification code is acquired by the image acquirer, a position of the well identification code may be adjusted utilizing the position controller.

With this mass spectrometer utilizing the MALDI, the position controller for use in the analysis processing is utilized to perform positional adjustment for acquiring the image of the well identification code. As such, no new parts for adjusting the position are needed.

According to the present invention, it is possible to provide the mechanism for specifying the sample plate in the mass spectrometer utilizing the MALDI without increasing the number of parts.

Other features, elements, characteristics, and advantages of the present invention will become more apparent from the following description of preferred embodiments of the present invention with reference to the attached drawings.

DESCRIPTION OF THE PREFERRED EMBODIMENTS

[1] First Embodiment

A configuration of a mass spectrometer according to the embodiment of the present invention will now be described with reference to the attached drawing.

(1) Entire Configuration of Mass Spectrometer

Figure 1:
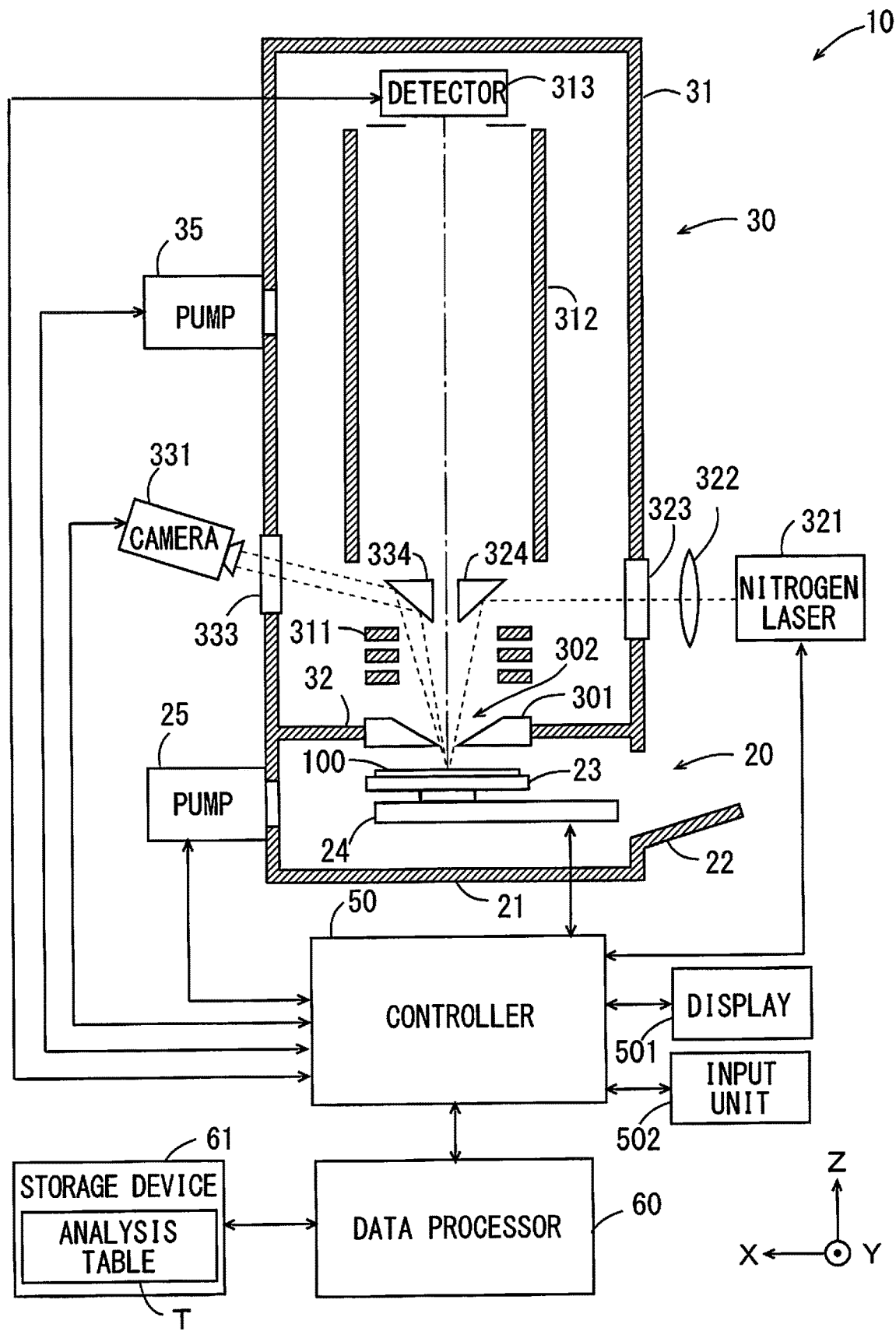
FIG. 1 is an overall view of a mass spectrometer according to a first embodiment.

FIG. 1 is an overall view of a mass spectrometer 10 according to a first embodiment. The mass spectrometer 10 performs ionization of samples by utilizing MALDI (Matrix Assisted Laser Desorption/Ionization). In FIG. 1, arrows indicating an X direction, a Y direction and a Z direction, which are orthogonal to one another, are depicted in order to clarify positional relationships. The X direction and the Y direction are orthogonal to each other within a horizontal plane, and the Z direction corresponds to an up-and-down direction.

As shown in FIG. 1, the mass spectrometer 10 includes a sample chamber 20 in which ionization of a sample is performed, an analysis chamber 30 in which separation and detection of ions is performed, a controller 50, and the like. The sample chamber 20 accommodates a sample plate 100 on which a sample/matrix mixture constituting a MALDI ion source is arranged. The sample chamber 20 is covered with a casing 21, and an openable/closable door 22 is provided at a side portion of the casing 21. An operator opens/closes the door 22 to perform operations of inserting the sample plate 100 into the sample chamber 20 and extracting the sample plate 100 from the sample chamber 20. The analysis chamber 30 is covered with a casing 31. In the analysis chamber 30, the separation and detection of ions generated from the sample/matrix mixture is performed. The sample chamber 20 and the analysis chamber 30 are separated from each other by a partition 32.

A tabular sample plate holder 23 for placing the sample plate 100 thereon is provided in the sample chamber 20. The sample plate holder 23 is supported on an XY stage 24. The XY stage 24 is driven, so that the sample plate holder 23 is moved in the X direction and the Y direction. The XY stage 24 is controlled by the controller 50. With this configuration, the sample plate 100 placed on the sample plate holder 23 can be moved in the X and Y directions.

A pump 25 is provided at a side portion of the sample chamber 20. The pump 25 is driven, so that the interior of the sample chamber 20 can be evacuated. The pump 25 is controlled by the controller 50. The sample/matrix mixture disposed in a well 110 of the sample plate 100 (see FIG. 2) set in the sample chamber 20 is ionized in the sample chamber 20 under vacuum.

An extractor electrode (extraction electrode) 301 for extracting the ions generated from the sample/matrix mixture to accelerate the extracted ions is provided at the partition 32. An opening 302 is formed in a center of the extractor electrode 301. The sample chamber 20 and the analysis chamber 30 communicate with each other through this opening 302. The ions generated from the sample/matrix mixture are introduced into the analysis chamber 30 through the opening 302.

The analysis chamber 30 accommodates an acceleration electrode 311, a flight tube 312, and a detector 313. The ions introduced into the analysis chamber 30 are accelerated by the acceleration electrode 311 and then introduced into the flight tube 312. The ions introduced into the flight tube 312 are separated based on a mass-to-charge ratio and then detected by the detector 313. The extractor electrode 301, the acceleration electrode 311, the flight tube 312, and the detector 313 are controlled by the controller 50.

A pump 35 is provided at a side portion of the analysis chamber 30. The pump 35 is driven, so that the interior of the analysis chamber 30 can be evacuated. The pump 35 is controlled by the controller 50. The ions introduced into the analysis chamber 30 are mass-separated under vacuum and then detected by the detector 313.

A nitrogen laser 321 is provided at an outside of the analysis chamber 30. The nitrogen laser 321 is controlled by the controller 50. Laser light emitted from the nitrogen laser 321 enters the analysis chamber 30 through a lens 322 and a window 323 provided at the casing 31 of the analysis chamber 30. The laser light that has entered the analysis chamber 30 is reflected at a mirror 324 and then led into the opening 302. The laser light that has passed through the opening 302 is emitted to the sample/matrix mixture constituting the MALDI ion source in the sample chamber 20.

A camera 331 is provided at an outside of the analysis chamber 30. The camera 331 includes an image sensor such as a CCD (Charge Coupled Device), for example. The camera 331 is controlled by the controller 50. An image of the sample/matrix mixture constituting the MALDI ion source is reflected at a mirror 334 and then enters the camera 331 through a window 333 provided at the casing 31. Thus, the camera 331 acquires the image of the sample/matrix mixture. In order for the camera 331 to acquire the image of the sample/matrix mixture, a light source (not shown) that emits white light to a photographing range of the camera 331 is provided.

The image photographed by the camera 331 is displayed on a display 501 connected to the controller 50. The display 501 is a liquid crystal monitor, for example. The operator observes the image of the sample/matrix mixture displayed on the display 501, and confirms whether the sample/matrix mixture is correctly arranged at a position to be irradiated with the laser light. The operator operates an input unit 502 connected to the controller 50 while observing the image on the display 501 to give an instruction to move the sample plate 100. In response to this operation, the controller 50 controls the XY stage 24 to allow the sample plate 100 to be moved in the X direction and the Y direction. When the operator has confirmed that the sample/matrix mixture is correctly arranged at the position to be irradiated with the laser light, the operation of moving the sample plate 100 is completed. Then, the operator operates the input unit 502 to give an instruction to start analysis processing. In response to this operation, the controller 50 controls the nitrogen laser 321 to allow the laser light to be emitted to the sample/matrix mixture. The controller 50 may automatically adjust the position of the sample plate 100 based on the image of the sample/matrix mixture without the operator's operation.

When the laser light has been emitted to the sample/matrix mixture, the matrix is rapidly heated. Thus, the matrix is vaporized together with the sample. The vaporized sample is ionized and then introduced into the analysis chamber 30 through the opening 302. The ions introduced into the analysis chamber 30 are mass-separated and thereafter detected by the detector 313. A detection signal of the ions detected by the detector 313 is A/D-converted in the controller 50. The A/D-converted detection signal is processed in a data processor 60, and a result of analysis is produced. The data processor 60 produces a mass spectrum, for example, as the result of the analysis.

(2) Configuration of Sample Plate

Figure 2:
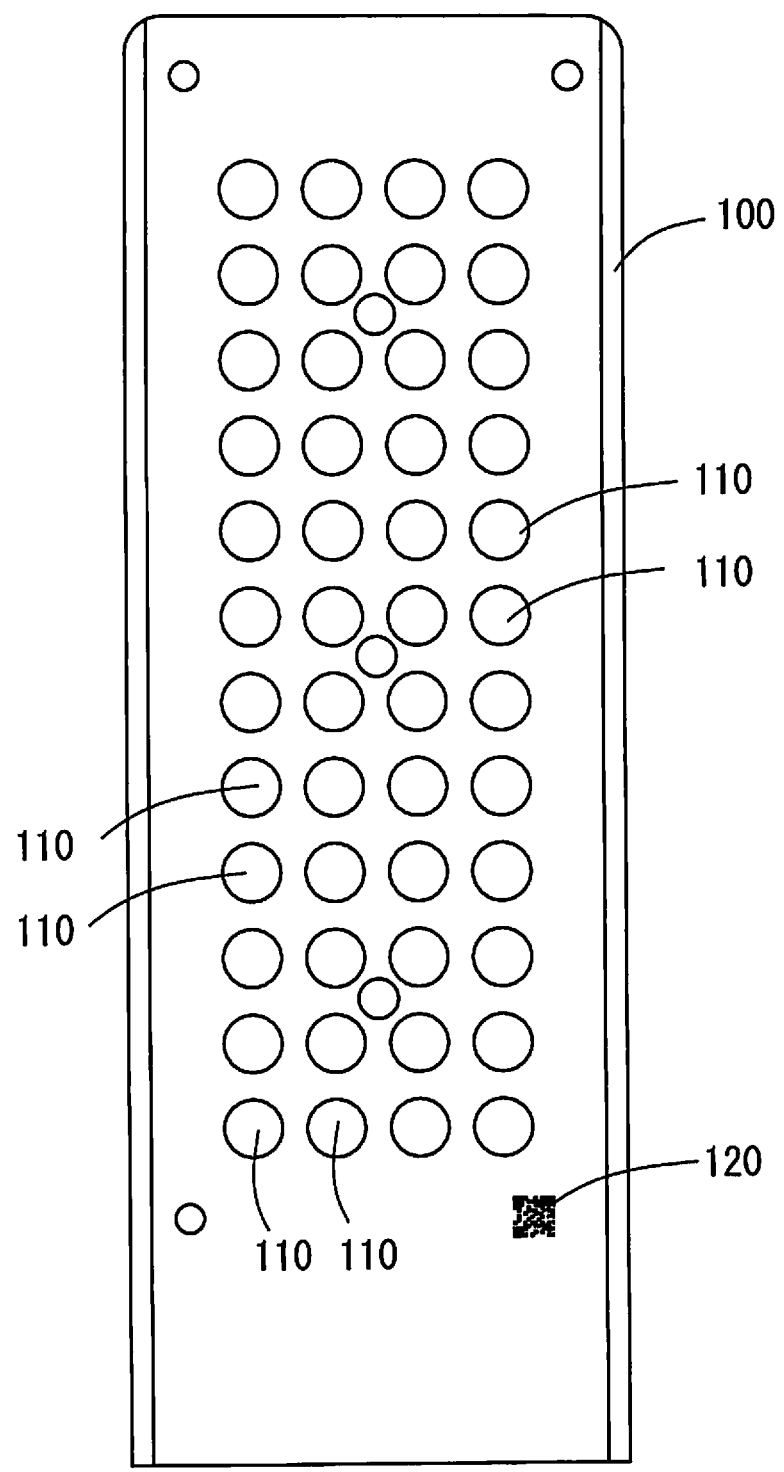
FIG. 2 is a plan view of a sample plate according to the first embodiment.

A configuration of the sample plate 100 will now be described with reference to FIGS. 2 and 3. FIG. 2 is a plan view of the sample plate 100. The sample plate 100 is a metallic tabular plate and has a plurality of wells 110 formed on an upper surface thereof. The wells 110 are recesses depressed downward from the upper surface of the sample plate 100, and the sample/matrix mixture is dropped in each well 110. In the example of FIG. 2, 48 wells 110 are arranged in 4 rows by 12 columns.

Also, a sample plate identification code 120 is printed on the upper surface of the sample plate 100. FIG. 3 is an enlarged view of a portion where the sample plate identification code 120 is printed. In the present embodiment, a QR code (trademark) being a two-dimensional code is utilized as the sample plate identification code 120. In this regard, however, a barcode other than the two-dimensional code may be utilized as the sample plate identification code 120. In the present embodiment, since the two-dimensional code is utilized as the sample plate identification code 120, the sample plate identification code 120 can be displayed in a small area on the upper surface of the sample plate 100. Furthermore, since the two-dimensional code is utilized as the sample plate identification code 120, a lot of information can be recorded in the sample plate identification code 120.

(3) Association between Sample Plate and Analysis Result

The operator performs reading of the sample plate identification code 120 on the upper surface of the sample plate 100 before or after the operation of dropping the sample/matrix mixture into each well 110 of the sample plate 100. A photographing apparatus (not shown) connected to the data processor 60 via a wired or wireless connection is used for the reading operation. The data processor 60 acquires plate identification information of the sample plate 100 from an image of the read sample plate identification code 120. The operator inputs information of the sample accommodated in each well 110 of the sample plate 100 in the data processor 60. More specifically, the operator inputs position information of each well 110 and the information of the sample accommodated in each well 110 in association with the plate identification information of the sample plate 100. Thus, the data processor 60 generates an analysis table T with respect to the sample plate 100. The data processor 60 stores the analysis table T into a storage device 61.

Figures 3, 4:
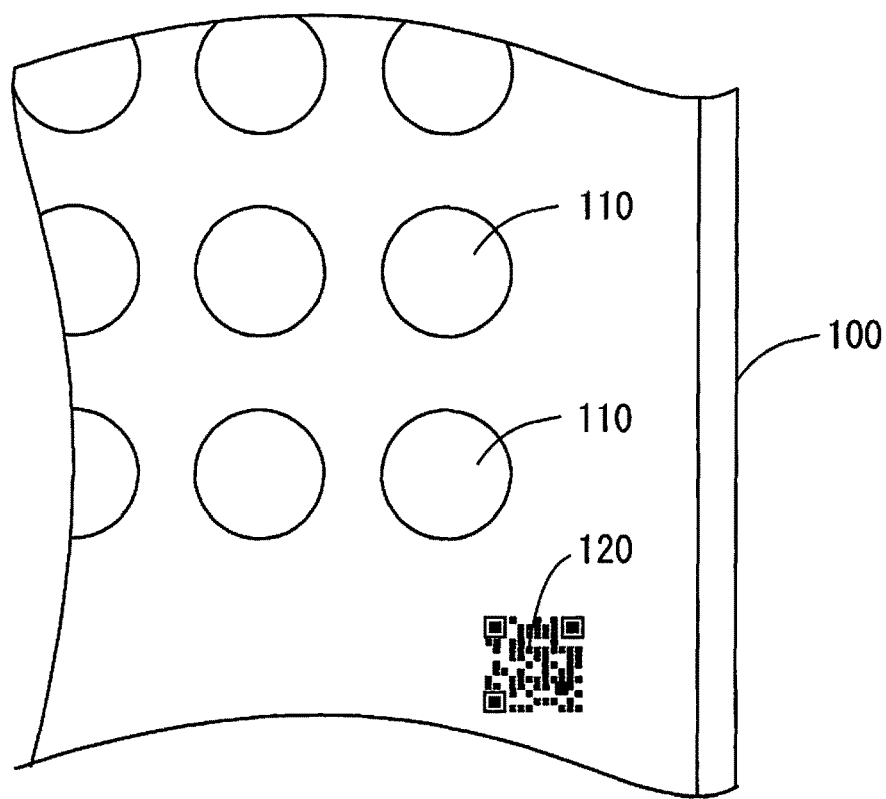
FIG. 3 is a partially enlarged plan view of the sample plate according to the first embodiment.
FIG. 4 is a diagram showing one example of an analysis table T.

FIG. 4 is a diagram showing one example of the analysis table T. The analysis table T has fields of "plate identification information", "well position information", "sample information", and "analysis result." When the operator has read the image of the sample plate identification code 120 using the data processor 60, the plate identification information is registered in the "plate identification information" field. Further, when the operator has input the position information of each well and the information of the sample accommodated in each well using the data processor 60, the "well position information" and the "sample information" are registered in the analysis table T.

Then, the operator sets in the sample chamber 20 the sample plate 100, which has already been completed with respect to the operations of reading the plate identification information and inputting the sample information. More specifically, the operator opens the door 22, sets the sample plate 100 at a predetermined position in the sample chamber 20, and operates the input unit 502 to give an instruction to start initial settings.

In response to the instruction to start the initial settings given by the operator, the controller 50 drives the XY stage 24 to move the sample plate 100. The controller 50 drives the XY stage 24 to move the position of the sample plate identification code 120 within the photographing range of the camera 331 in order to perform the operation of reading the sample plate identification code 120 of the sample plate 100. Information as to horizontal and vertical sizes of the sample plate 100 and as to an arrangement position and a size of the sample plate identification code 120, and the like are registered in advance in the controller 50. After the controller 50 moves the sample plate identification code 120 to a position within the photographing range of the camera 331, the controller 50 drives the camera 331 to acquire the image of the sample plate identification code 120.

The controller 50 acquires the plate identification information of the sample plate 100 from the acquired image of the sample plate identification code 120. Thus, the controller 50 can acquire the plate identification information of the sample plate 100, which is accommodated in the sample chamber 20 and is immediately before analysis processing is started.

Then, the controller 50 drives the XY stage 24 to move a well 110 accommodating a sample/matrix mixture being the first analysis subject to the position to be irradiated with the laser light. At this time, the image of the sample/matrix mixture photographed by the camera 331 is displayed on the display 501. The operator operates the input unit 502 to adjust a position of the sample plate 100 to move the sample/matrix mixture being the analysis subject to a correct position. After the sample/matrix mixture is adjusted at the correct position, the operator gives an instruction to start the analysis processing.

Figure 5:
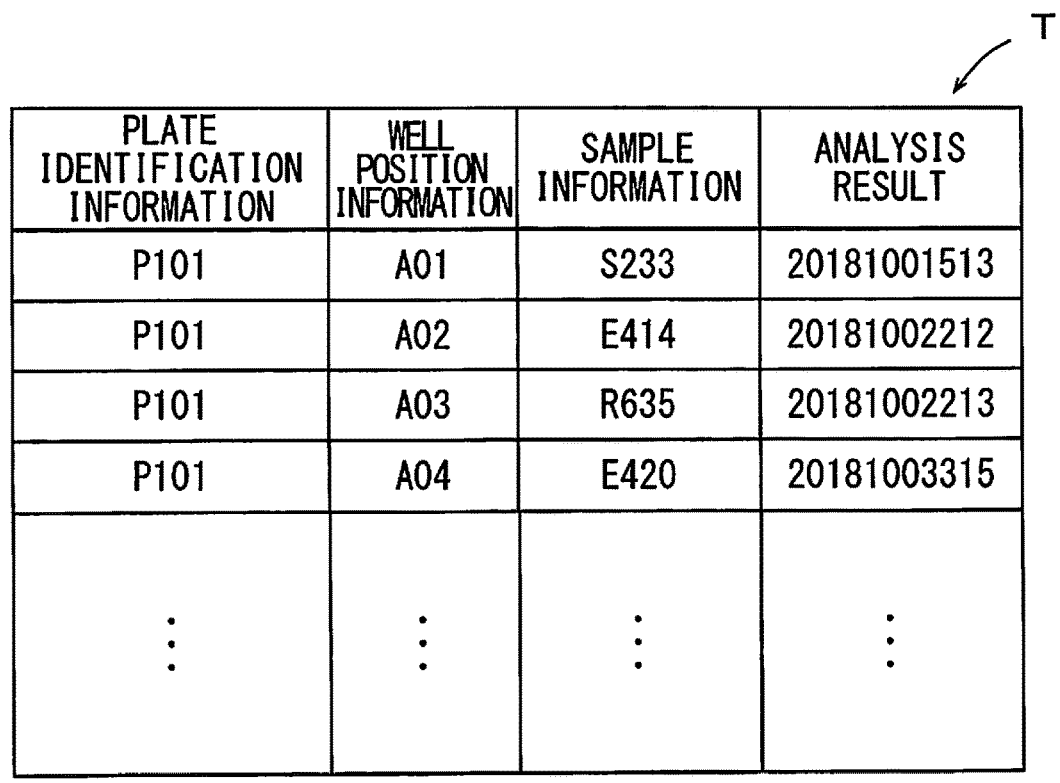
FIG. 5 is a diagram showing one example of the analysis table T in which a result of analysis is registered.

In response to the instruction to start the analysis processing given by the operator, the controller 50 drives the nitrogen laser 321 to emit the laser light to the sample/matrix mixture being the analysis subject. Ions generated from the sample/matrix mixture are mass-separated and thereafter detected by the detector 313. The controller 50 can specify the position of the well 110 accommodating the sample/matrix mixture being the analysis subject from information as to the driving of the XY stage 24. The controller 50 supplies the plate identification information and the position information of the well 110 together with a detection signal of the detected ions to the data processor 60. The data processor 60 produces an analysis result based on the detection signal. The data processor 60 registers the produced analysis result in the analysis table T. The data processor 60 registers the analysis result in association with the specified plate identification information and the specified position information of the well 110. FIG. 5 shows the analysis table T in which information of the analysis result is registered. In FIG. 5, as compared with FIG. 4, the information of the analysis result is added to the analysis table T.

Thereafter, the controller 50 drives the XY stage 24 to move the sample plate 100 in order to perform the analysis processing to a sample/matrix mixture being the next analysis subject. The operator adjusts the position of the sample plate 100 while observing the image on the display 501. In this way, the analysis processing is performed to all of the sample/matrix mixtures arranged on the sample plate 100, and the analysis table T is created.

As has been described above, the mass spectrometer 10 of the present embodiment acquires the image of the sample plate identification code 120 by utilizing the camera 331, which is provided for the purpose of acquiring the image for confirming the position of the sample/matrix mixture constituting the MALDI ion source. The mass spectrometer 10 specifies the plate identification information from the image of the sample plate identification code 120 and associates the analysis result of the detected ions with the plate identification information.

The mass spectrometer 10 of the present embodiment does not need any new parts for acquiring the image of the sample plate identification code 120. It is possible to provide the mechanism for specifying the sample plate 100 in the mass spectrometer 10 without increasing the number of parts.

Moreover, in the mass spectrometer 10 of the present embodiment, when the image of the sample plate identification code 120 is acquired, the position of the sample plate identification code 120 is adjusted utilizing the XY stage 24. The XY stage 24 for use in the analysis processing is utilized for the positional adjustment to acquire the image of the sample plate identification code 120. As such, no new parts are necessary for the positional adjustment.

[2] Second Embodiment

A second embodiment of the present invention will now be described. A configuration of the mass spectrometer 10 of the second embodiment is similar to that of the first embodiment shown in FIG. 1 and is therefore not described below.

(1) Configuration of Sample Plate

Figure 6:
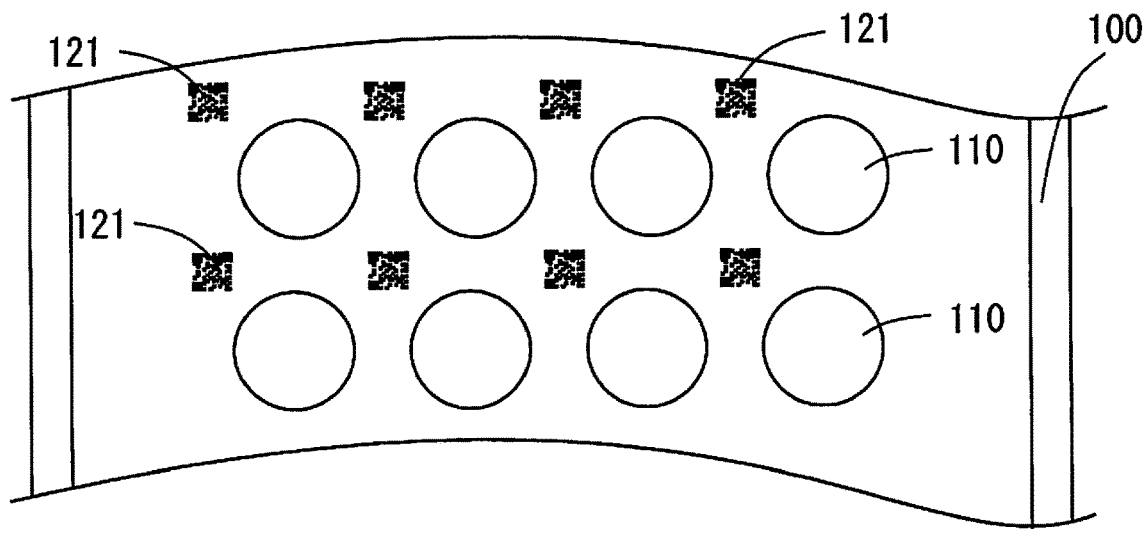
FIG. 6 is a partially enlarged plan view of a sample plate according to a second embodiment.

The entire configuration of the sample plate 100 of the second embodiment is similar to that of the first embodiment shown in FIG. 2. The sample plate identification code 120 is displayed on the upper surface of the sample plate 100 of the second embodiment as shown in FIG. 3 similarly to the first embodiment. Further, a well identification code 121 is displayed in a position in the vicinity of each well 110 of the sample plate 100 of the second embodiment as shown in FIG. 6.

In the present embodiment, a QR code (trademark) being a two-dimensional code is utilized as the well identification code 121. In this regard, however, a barcode other than the two-dimensional code may be utilized as the well identification code 121. In the present embodiment, since the two-dimensional code is utilized as the well identification code 121, a large number of well identification codes 121 can be displayed in a small area on the upper surface of the sample plate 100. Furthermore, since the two-dimensional code is utilized as the well identification code 121, a lot of information can be recorded in the well identification code 121.

(2) Association between Well and Analysis Result

Similarly to the first embodiment, the operator performs reading of the sample plate identification code 120 on the upper surface of the sample plate 100 before or after the operation of dropping a sample/matrix mixture into each well 110 of the sample plate 100. Similarly to FIG. 4 described in the first embodiment, the storage device 61 stores the analysis table T with respect to the sample plate 100. The operator subsequently sets the sample plate 100 at a predetermined position in the sample chamber 20 and operates the input unit 502 to give an instruction to start initial settings.

Similarly to the first embodiment, the controller 50 drives the camera 331 to acquire an image of the sample plate identification code 120. The controller 50 acquires plate identification information of the sample plate 100 from the acquired image of the sample plate identification code 120.

Then, the controller 50 drives the XY stage 24 to move the well identification code 121 displayed in the vicinity of a well 110 accommodating a sample/matrix mixture being the first analysis subject to a position within the photographing range of the camera 331. After the controller 50 moves the well identification code 121 to the position within the photographing range of the camera 331, the controller 50 drives the camera 331 to acquire an image of the well identification code 121. The controller 50 acquires well identification information of the well 110 accommodating the sample/matrix mixture being the analysis subject from the acquired image of the well identification code 121.

Then, the controller 50 drives the XY stage 24 to move the well 110 accommodating the sample/matrix mixture being the first analysis subject to a position to be irradiated with laser light. The operator operates the input unit 502 to adjust the position of the sample plate 100 and move the sample/matrix mixture being the analysis subject to a correct position.

In response to an instruction to start analysis processing given by the operator, the controller 50 drives the nitrogen laser 321 to emit the laser light to the sample/matrix mixture being the analysis subject. Ions generated from the sample/matrix mixture are mass-separated and thereafter detected by the detector 313.

The controller 50 supplies the plate identification information and the well identification information together with a detection signal of the detected ions to the data processor 60. The data processor 60 produces an analysis result based on the detection signal. The data processor 60 registers the produced analysis result in the analysis table T. The data processor 60 specifies, based on the plate identification information and the well identification information, a record of the sample, of which analysis result has been obtained, among records registered in the analysis table T. That is, since position information of the well 110 of the sample plate 100 is recorded in the well identification information, the data processor 60 can specify the record corresponding to the sample, of which analysis result has been obtained, among the records registered in the analysis table T.

As has been described above, the mass spectrometer 10 of the present embodiment acquires the image of the well identification code 121 by utilizing the camera 331, which is provided for the purpose of acquiring the image for confirming the position of the sample/matrix mixture constituting the MALDI ion source. The mass spectrometer 10 specifies the well identification information from the image of the well identification code 121 and associates the analysis result of the detected ions with the well identification information.

The mass spectrometer 10 of the present embodiment does not need any new parts for acquiring the image of the well identification code 121. It is possible to provide the mechanism for specifying the well 110 in the mass spectrometer 10 without increasing the number of parts.

Moreover, in the mass spectrometer 10 of the present embodiment, when the image of the well identification code 121 is acquired, the position of the well identification code 121 is adjusted utilizing the XY stage 24. The XY stage 24 for use in the analysis processing is utilized for the positional adjustment to acquire the image of the well identification code 121. As such, no new parts are necessary for the positional adjustment.

[3] Correspondences Between Constituent Elements in Claims and Parts in Preferred Embodiments In the following paragraphs, non-limiting examples of correspondences between various elements recited in the claims below and those described above with respect to various preferred embodiments of the present invention are explained. In the aforementioned embodiments, the XY stage 24 is an example of a position controller, the camera 331 is an example of an image acquirer, and the nitrogen laser 321 is an example of a laser light emitter.

As each of various elements recited in the claims, various other elements having configurations or functions described in the claims can be also used.

[4] Other Embodiments

The sample plate identification code 120 may be printed on a plate surface of the sample plate 100. Alternatively, a seal on which the sample plate identification code 120 is printed may be attached to the sample plate 100. The well identification code 121 may be printed on the plate surface of the sample plate 100. Alternatively, a seal on which the well identification code 121 is printed may be attached to the sample plate 100.

In the aforementioned embodiments, the step of acquiring the image of the well identification code 121 and the step of acquiring the image of the sample/matrix mixture are performed as the separate steps. If the camera 331 has a wide angle of view and can therefore include the well identification code 121 and the sample/matrix mixture in the photographing range, the both images may be acquired in a single photographing step.

While preferred embodiments of the present invention have been described above, it is to be understood that variations and modifications will be apparent to those skilled in the art without departing the scope and spirit of the present invention. The scope of the present invention, therefore, is to be determined solely by the following claims.

I claim:

1. A mass spectrometer utilizing MALDI, Matrix-Assisted Laser Desorption/Ionization, comprising:
    a position controller that adjusts a position of a sample plate on which a sample/matrix mixture is positioned;
    an image acquirer that acquires an image of the sample/matrix mixture on the sample plate and an image of a sample plate identification code displayed on the sample plate;
    a laser light emitter that emits a laser light to the sample/matrix mixture on the sample plate;
    a detector that detects ions generated from the sample/matrix mixture by the emission of the laser light by the laser light emitter; and
    a controller comprising circuitry configured to acquire the image of the sample/matrix mixture on the sample plate from the image acquirer, confirm a position of the sample/matrix mixture from the image of the sample/matrix mixture on the sample plate, acquire the image of the sample plate identification code on the sample plate from the image acquirer, and acquire plate identification information of the sample plate from the image of the sample plate identification code.

2. The mass spectrometer according to claim 1, wherein the sample plate identification code includes a two-dimensional code.

3. The mass spectrometer according to claim 1, wherein when the image of the sample plate identification code is acquired by the image acquirer, the circuitry of the controller is configured to control the position controller such that the position controller adjusts a position of the sample plate identification code.

4. The mass spectrometer according to claim 1, wherein the sample plate has a plurality of wells in which a plurality of sample/matrix mixtures are positioned, and the circuitry of the controller is configured to acquire an image of a well identification code that is displayed in a periphery of each well for identifying each well by utilizing the image acquirer, and to specify well identification information of each well from the image of the well identification code.

5. The mass spectrometer according to claim 4, wherein the well identification code includes a two-dimensional code.

6. The mass spectrometer according to claim 4, wherein when the image of the sample plate identification code is acquired by the image acquirer, the circuitry of the controller is configured to control the position controller such that the position controller adjusts a position of the sample plate identification code.

7. The mass spectrometer according to claim 1, wherein the position controller comprises an XY stage.

8. The mass spectrometer according to claim 1, wherein the image acquirer comprises a camera.

9. The mass spectrometer according to claim 1, wherein the image acquirer comprises an image sensor.

10. The mass spectrometer according to claim 1, wherein the image acquirer comprises an image sensor comprising a charge couple device.

11. The mass spectrometer according to claim 1, wherein the laser light emitter comprises a nitrogen laser.

12. The mass spectrometer according to claim 1, wherein the position controller comprises an XY stage, and the image acquirer comprises an image sensor.

13. The mass spectrometer according to claim 1, wherein the position controller comprises an XY stage, and the image acquirer comprises an image sensor comprising a charge couple device.

14. The mass spectrometer according to claim 1, further comprising:
    an analysis chamber accommodating the detector; and
    a sample chamber accommodating the position controller,
    wherein the image acquirer and the laser light emitter are positioned outside the analysis chamber.

15. The mass spectrometer according to claim 2, wherein the position controller comprises an XY stage.

16. The mass spectrometer according to claim 2, wherein the image acquirer comprises an image sensor.

17. The mass spectrometer according to claim 2, wherein the image acquirer comprises an image sensor comprising a charge couple device.

18. The mass spectrometer according to claim 2, wherein the position controller comprises an XY stage, and the image acquirer comprises an image sensor.

19. The mass spectrometer according to claim 2, wherein the position controller comprises an XY stage, and the image acquirer comprises an image sensor comprising a charge couple device.

20. The mass spectrometer according to claim 2, further comprising:
    an analysis chamber accommodating the detector; and
    a sample chamber accommodating the position controller,
    wherein the image acquirer and the laser light emitter are positioned outside the analysis chamber.

* * * * *